July 16, 1968  R. K. DIMMITT ET AL  3,392,861
CONTAINER WITH CLOSURE
Filed April 22, 1966  2 Sheets-Sheet 1
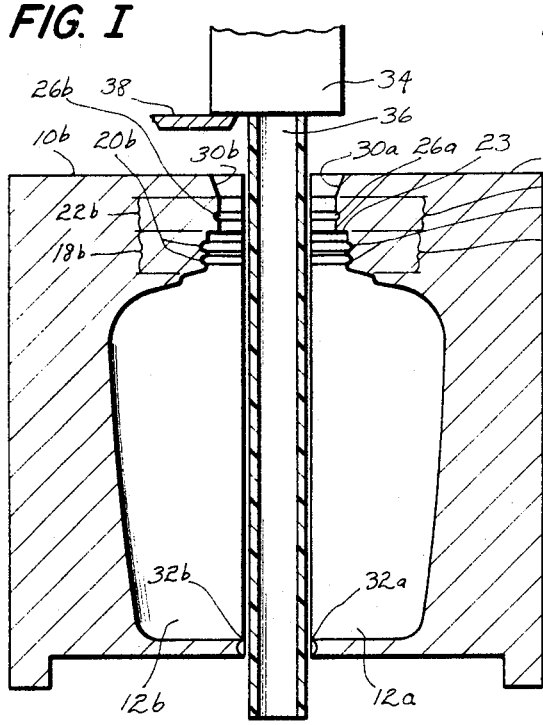
FIG. I
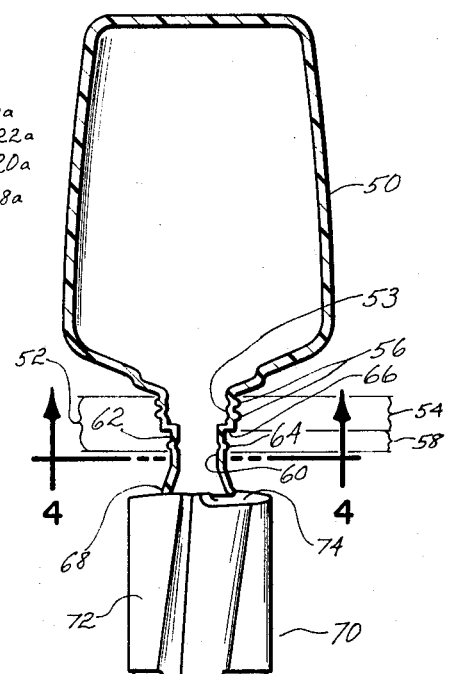
FIG. III
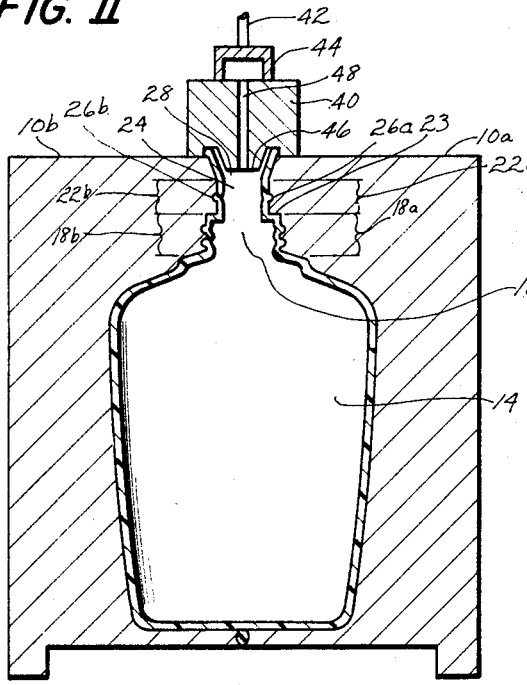
FIG. II
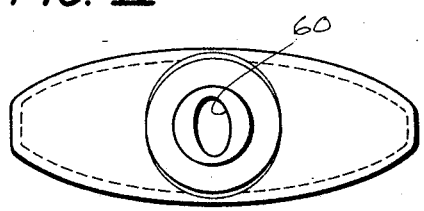
FIG. IV
INVENTOR.
ROBERT K. DIMMITT
CLARENCE G. REBER
BY
James C. Lagomarsino
ATTORNEY:

July 16, 1968  R. K. DIMMITT ET AL  3,392,861
CONTAINER WITH CLOSURE
Filed April 22, 1966  2 Sheets-Sheet 2
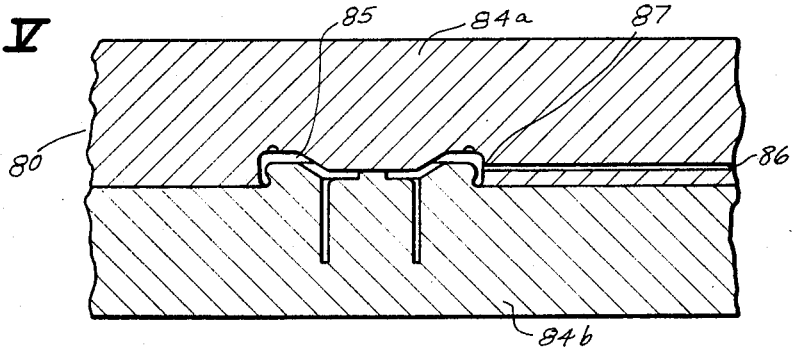
FIG. V
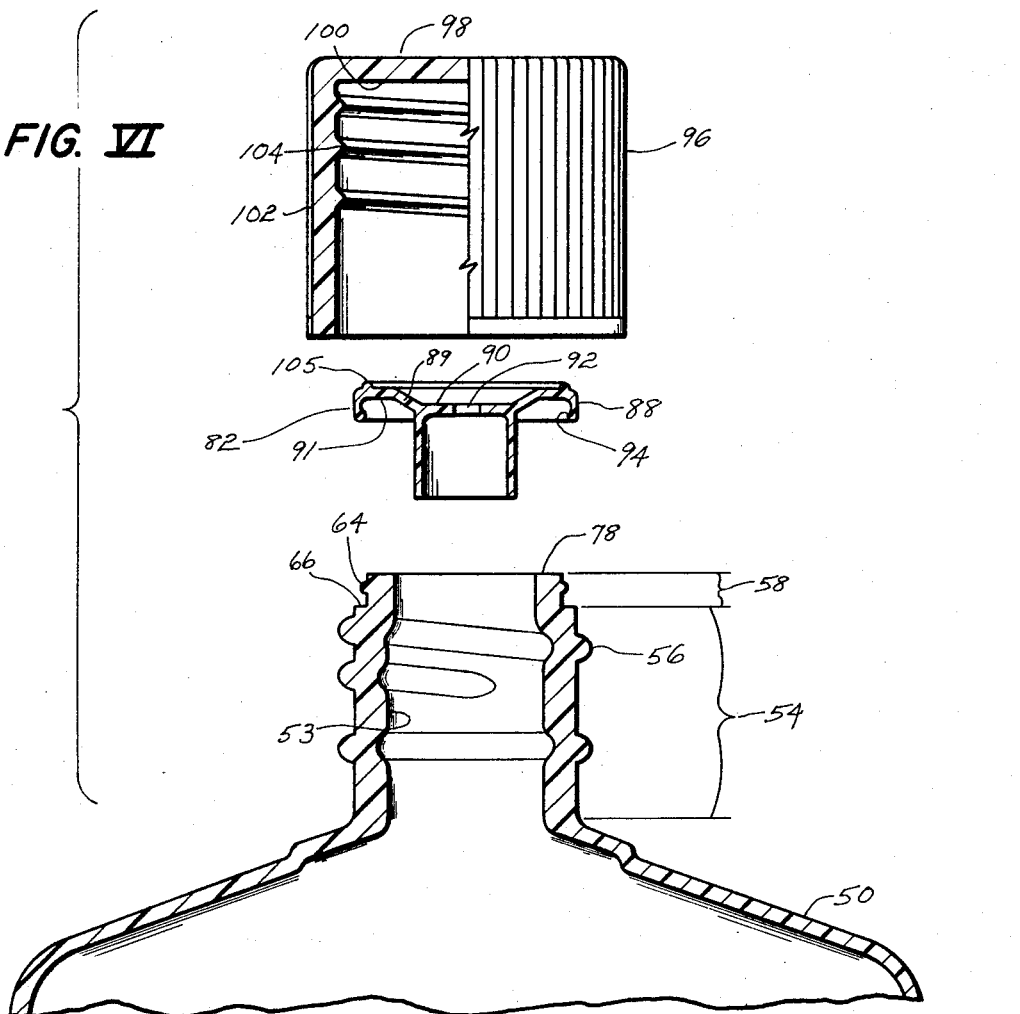
FIG. VI
INVENTOR.
ROBERT K. DIMMITT
CLARENCE G. REBER
BY
ATTORNEY:

United States Patent Office 3,392,861
Patented July 16, 1968

3,392,861
CONTAINER WITH CLOSURE
Robert K. Dimmitt, West Hartford, and Clarence G. Reber, Avon, Conn., assignors to Monsanto Company, St. Louis, Mo., a corporation of Delaware
Filed Apr. 22, 1966, Ser. No. 544,460
6 Claims. (Cl. 215—40)

ABSTRACT OF THE DISCLOSURE

This invention relates to a container and closure construction therefor and the method of forming the same wherein the upper neck portion of a blow molded container presents a flat sealing surface for engagement with a conforming surface formed on the inside of a fitment separate from the closure and adapted for securement to the outside neck portion of the container.

---

This invention relates generally to molded plastic articles and attachments therefor, and more particularly to a method of forming a plastic bottle with a restricted opening.

In the manufacture of blow molded theremoplastic bottles having narrow discharge openings for controlling the outflow of the liquid contents, it is conventional to ream the inside surface of the bottle neck smooth after blow molding to permit insertion of a friction fitting plug having an orifice. The contents are emitted from this type of bottle by squeezing the flexible sides to force the liquid through the plug opening.

In some applications the inside surface of the bottle neck is precisely undercut after reaming to provide a notch, for example, to mate with a bead on the side wall of the plug to prevent the plug from coming loose when pressure is developed by squeezing the bottle sides. The top of the plug, however, has a tendency to bow upward and flex the plug side wall inward when pressure is developed within the bottle, thereby pulling the bead out of the undercut and promoting pop out of the plug from the bottle neck.

Sufficient dimensional accuracy of the internal neck diameter to retain the plug cannot be achieved solely by the blowing step. Variations in the neck wall thickness will occur and thereby necessitate subsequent reaming.

In high speed production operations, reaming and undercutting present considerable problems, wherein the machined neck surface must be concentric and have extremely close tolerances in order for the plug to fit snugly within the neck. An expensive, radially expandable and contractable reaming head is usually employed when the neck surface is undercut. Wear of cutting surfaces is considerable and tooling costs are high when the bottle is made from a tough, hard thermoplastic composition such as a polymer of vinyl chloride or polypropylene. Shavings and chips from the inside of the bottle frequently end up within the container and present an unsightly appearance to the customer when, for example, a transparent bottle is involved.

The problem has occasionally been overcome in the past by providing a solid bottle neck leaving only the restricted opening in the finished neck. This procedure, however, greatly decreases the output of bottle filling equipment since filling is restricted to a narrow orifice rather than through the full neck opening.

Accordingly it is the principal object of this invention to provide an improved, flexible thermoplastic bottle having a top fitment with an opening which has improved resistance to separation from the bottle when pressure is developed within the container.

An additional object of this invention is to provide simple and improved means for retaining a neck fitment on a thermoplastic bottle, which means are formed by conventional blow molding procedures during formation of the bottle.

A further object of this invention is to provide an improved method for forming thermoplastic bottles with restricted discharge openings.

A particular object of this invention is to provide a method for manufacturing thermoplastic bottles with restricted discharge openings which obviates the cutting and reaming problems associated with finishing the bottle necks.

An additional object of this invention is to provide a cooperating fitment and closure for a thermoplastic bottle with a restricted discharge opening which have improved sealing means.

Other objects of this invention will in part be obvious and will in part appear hereinafter.

These and other objects are accomplished by forming a thermoplastic bottle having a restricted discharge opening by enclosing a generally tubular length of thermoplastic material within a partible mold, expanding the length into surface contact with the internal walls of the mold to form a bottle having an open, generally cylindrical neck with locking means on the outside surface thereof at its upper end, and including a sprue integrally attached to the neck, removing the sprue to provide a sealing surface at the extremity of the neck above the locking means, molding a fitment for the neck having a generally cylindrical top with a discharge opening and an integral side wall having cooperating locking means, the fitment being designed to fit over the outside of the neck of the bottle while remaining out of contact with the inside of the neck, applying the fitment over the neck so that the locking means of the neck and fitment are engaged and the inside surface of the top of the fitment sealably contacts the neck sealing surface with an inner surface of the neck out of contact with the fitment.

For a fuller understanding of the nature and objects of this invention, reference should be had to the following detailed description taken in connection with the accompanying drawings in which:

FIG. I is an elevational, schematic, partial sectional view illustrating an extruded parison between open sections of a partible blow mold.

FIG. II is an elevational, schematic partial sectional view illustrating the expanded parison and blow head assembly.

FIG. III is an elevational schematic sectional view illustrating a fly cutter removing a sprue from a blown bottle.

FIG. IV is a partial plan view along the line IV—IV of FIG. III illustrating the bottle neck after removal of the sprue.

FIG. V is a partial vertical section of an injection mold assembly.

FIG. VI is an elevational, schematic sectional view illustrating the bottle, fitment and cap.

With reference to the drawings wherein identical numerals refer to identical parts, there are shown in FIGS. I and II a partible blow mold comprising two mold halves 10a and 10b. The mold halves may be mounted on conventional supporting and operating mechanisms not shown for lateral movement between the separated mold half position shown in FIG. I and the closed mold half position shown in FIG. II. Each mold half 10a and 10b has an internal cavity portion 12a and 12b such that when the mold halves are closed a cavity 14 is defined having the peripheral configuration of the body portion of a bottle to be molded. Located above cavity 14 is a cylindrical neck defining portion 16 formed by cooperating semicylindrical portions 18a and 18b of mold halves 10a and 10b. The surfaces of cooperating semicylindrical portions 18a and 18b have helical grooves 20a and 20b cut therein which will correspond to threads on the neck of the bottle to be molded. Situated above semicylindrical portions 18a and 18b of the mold halves are mating recessed top portions 22a and 22b which form neck extension 24 when the mold halves are in closed position. Neck extension 24 is smaller in diameter than cylindrical neck defining portion 16 so that annular edge 23 is formed between neck defining portion 16 and neck extension 24 when the mold halves are in closed position. Each surface of mating recessed top portions 22a and 22b has an annular groove 26a and 26b of semicylindrical cross section cut therein which will correspond to an annular bead on the neck extension of the bottle to be molded. Reversed frusto-conical opening 28 is formed when the mold halves are closed by outwardly flaring portions 30a and 30b of the walls of the mold halves extending upward from mating semicylindrical top portions 22a and 22b. Cooperating pinch surfaces 32a and 32b are provided for bottom sealing of the parison when the mold halves are closed.

In operation, heated thermoplastic material issues from a conventional extrusion head 34 in the form of a parison 36 illustrated in cross section in FIG. I. As illustrated in FIG. I the parison is positioned between open mold halves 10a and 10b which are situated under the extrusion head. Thereafter the mold members are closed, and a cut-off or shearing blade 38 adapted to move transversely across the outer end of the extrusion head severs the connection between the plastic in the mold and the extrusion outlet. The mold halves are closed about the parison while pinching the exteriorly projecting portion of the parison in the joint thereof by cooperating surfaces 32a and 32b.

A blow assembly is shown in FIG. II which includes blow head 40 which can be operated by piston rod 42 which may be connected to the blow head by a schematically illustrated mounting bracket 44. Piston rod 42 would extend from a pressurized fluid operated piston, not shown. Blow head 40 has a lower projecting portion 46 which extends into conical opening 28 at the top of the mold when the blow head is positioned on the mold as in FIG. II, and serves to keep the upper end of the parison open to permit introduction of the blowing air. After the blow head has been positioned over opening 28, the pinched parison is thereafter blown by air pressure introduced through passageway 48 in blow head 40 into surface contact with the mold cavity walls as illustrated in FIG. II.

The expanded thermoplastic material is then allowed to cool and set in the mold prior to separation of the mold sections to remove the formed bottle. The apparatus components then return to their original positions for subsequent molding operations. The waste, flash material attached to the bottom of the bottle extending across the full width is then trimmed from the bottle by conventional means well known in the art.

As illustrated in FIGS. III, IV and VI, the bottle after removal of the bottom flash material has a body 50 and a cylindrical neck 52 having a lower portion 54 with a non-symmetrical unfinished inner face 53 and primary thread means 56 on the outer surface thereof. Integral with the lower portion of the neck is an upper portion 58 having an irregular, noncylindrical inside surface 60 and an outside surface 62 with an annular integral locking bead 64. The integral upper portion 58 of the neck is radially indented inward from the outer face of the lower portion so as to form circular shoulder 66 located between the outside surface of the upper portion and an extension of the outside surface of the lower portion. An annular slot is therefore defined by the space above circular shoulder 66 between the outside surface of the lower portion 54 of the neck and the outside surface of the upper portion 58 into which the side wall of a neck fitment will subsequently be placed. Attached to the upper portion of the bottle neck is a sprue 68, also formed during the blowing step.

As illustrated in FIG. III a fly cutter 70 capable of rotating at high speed and well known in the art is utilized to remove this sprue from the finished article. Fly cutter 70 has a cylindrical, solid, barrel portion 72 with a stepped, spirally cut upper surface 74 designed so as to cut off sprue 68 while rotating at high speed, and when slowly moved axially upward into contact with the sprue by conventional drive means attached to integral shaft 76. When the sprue has been removed to within a slight distance above integral locking bead 64, fly cutter 70 is moved axially down and away from the bottle neck to terminate the sprue removal operation. The cutting action of fly cutter removes the sprue and provides smooth sealing surface 78 as illustrated in FIG. VI at the extremity of the upper portion 58 of the bottle neck, corresponding to the wall thickness of the bottle neck a that point.

A conventional injection mold assembly 80, well known in the art, is illustrated schematically in FIG. V for molding bottle neck fitment 82 of FIG. VI. Mold assembly 80 comprises axially separable mold halves 84a and 84b which form cavity 85 corresponding to the configuration of neck fitment 82 when in closed position. Heated, thermoplastic material is injected under high pressure through narrow channel 86 in mold half 84a into the cavity. After cooling and setting, mold halves 84a and 84b are axially separated and the fitment removed. Waste material attached to the fitment at 87, the point where narrow channel 86 enters cavity 85 is easily removed usually by manually snapping it off.

As illustrated in FIG. VI, a thermoplastic fitment 82 is provided by the injection molding step of FIG. V. Fitment 82 has a generally cylindrical side wall 88 essentially equivalent in length to that of the upper portion 58 of the bottle neck and integrally attached to a top 89 with an upper surface 90, a smooth lower surface 91, and a discharge orifice 92 extending between the upper and lower surfaces. Side wall 88 has an inside surface with cooperating locking means at its lower end comprising an inwardly extending lip 94. Fitment 82 is designed so that when it is placed on the upper portion 58 of the bottle neck, side wall 88 fits into the annular slot above shoulder 66 of the neck without protruding outward beyond the outside surface of the lower portion of the neck, while inwardly extending lip 94, initially, resiliently fits over annular locking bead 64 of the neck, and thereafter cooperatively engages annular bead 64 to lock fitment 82 onto the bottle neck, while smooth lower surface 91 of closed top 89 of the fitment sealably contacts smooth sealing surface 78 at the extremity of the upper portion of the neck to prevent the bottle contents from leaking between the fitment and the neck. The bottle contents are emitted only through orifice 92 by either turning the bottle upward or squeezing the flexible sides to decrease the inside volume and force the liquid through the orifice.

A cap 96 is provided as a closure for bottle 50 having a closed top 98 with a sealing surface 100 on its underside and a depending skirt 102 with secondary thread means 104 on its inside surface. Fitment 82 may include sealing means on the upper surface 90 of closed top 89 comprising an integral, raised, annular bead 105 located between the discharge orifice 92 and the junction of the closed top 89 with side wall 88. Closure cap 96 is designed so that secondary thread means 104 engage primary thread means 56 on the bottle neck when the cap is screwed axially downward onto the neck and over fitment 82. Sealing means 105 of fitment 82 sealably engages sealing surface 100 on the cap when the cap is moved to its lowermost extremity on the neck. Sealing means 105 and sealing surface 100 thus close off dispensing orifice 92 of the fitment and prevent the bottle contents from leaking between the closure cap 96 and bottle neck 52.

The above description, and particularly the drawings are set forth for purposes of illustration only and are in no way to be taken in a limited sense.

As previously stated, this invention is directed toward forming a thermoplastic bottle having a fitment with a restricted opening, comprising the steps of enclosing a generally tubular length of thermoplastic material within a partible mold, expanding this length into surface contact with internal walls of the mold to form a hollow bottle having an open, generally cylindrical neck with locking means on the outside surface thereof at its upper end, and including a waste sprue integrally attached to the neck, removing the waste sprue to provide a flat sealing surface at the extremity of the neck above the locking means, molding a fitment for the neck having a generally cylindrical top with a discharge opening and an integral side wall having cooperating locking means, said fitment being designed to fit over the outside of the neck of the bottle while remaining out of contact with the inside of the neck, applying the fitment over the neck so that the locking means of the neck and fitment are engaged and the inside surface of the closed top of the fitment sealably contacts the neck sealing surface, with the inner surface of the neck out of contact with the fitment.

The thermoplastic bottle provided has an open generally cylindrical neck with an inner face, a sealing surface at its upper extremity, locking means on the outer face of the neck adjacent the upper extremity, a fitment for the neck having a generally cylindrical side wall integrally attached to a top with an upper and a lower surface and a discharge opening extending between the upper and lower surfaces, said side wall having cooperating locking means such that when the fitment is applied on the neck, the cooperating locking means of the fitment engage the locking means of the neck and the lower surface of the top of the fitment sealably contacts the sealing surface at the upper extremity of the neck with the inner face of the neck remaining out of contact with the fitment.

Blow molding of thermoplastic parisons is well known in the art and is subject to many variations in the type of blowing technique employed as well as the particular series of sequential operations performed upon the parison and the blow molding of the parison into a finished article. Reference may be had to U.S. 2,349,177 in this regard. The components may be utilized in combination with a molding machine of the type generally described in U.S. 2,952,034.

Any suitable facing or cutting head may be utilized to remove the sprue from above the bottle neck. A high-speed saw may be used initially to sever the sprue, followed by exposure to a fly cutter or facing tool to provide a smooth finish to the rough cut neck surface.

The top of the neck fitment may be designed to slope slightly downwardly and inwardly within the side wall of the fitment so as to provide a hollow, conical reservoir to hold any material left on the surface of the fitment after use while it drains back into the bottle through the discharge orifice. Aside from this, the downward bend strengthens the top structurally and tends to increase its resistance against puffing up when pressure is developed against the fitment from within the bottle.

The locking means for retaining the fitment on the bottle neck may be provided by any of the conventional devices obtained with standard molding techniques, such as cooperating threads or frictionally engaging grooves and beads. It is an important feature of the present invention that the means for retaining the fitment on the bottle neck be completely controlled by the blowing operation, i.e., by the cooperating mold dimensions as opposed to providing such means by an independent step subsequent to blowing. It is essential, however, that the locking means be designed to retain the fitment on the outside surface on the neck in order to realize the benefits of the present invention, wherein sealing between a plug and the inside surface of the bottle neck is avoided.

Thermoplastic bottles of any shape are within the scope of the present invention, however the benefits of the invention are especially applicable to the manufacture of bottles having necks which are narrow in relation to the maximum width of a non-circular body, for example an oval design or the oblong shape of the illustrated embodiment. In molding such configurations, it is conventional and economical to extrude the parison with diametrically disposed thickened wall sections wherein the thickened sections constitute that part of the parison which will undergo maximum expansion during blowing to define the extremities of the body diameter, as disclosed in U.S. 2,935,764. In such cases the thickened sections remain essentially unexpanded in the narrow neck area of the blown bottle, and grinding of considerable material from the inside diameter to provide a smooth, concentric inside surface for a plug type closure is eliminated.

Sealing the bottle interior from the cooperating threads of the bottle and cap closure may be provided in a variety of ways. A flexible liner may be used as a gasket on the underside of the closure cap to resiliently and sealably contact the closed top of the neck fitment, or a sealing bead may be molded on the cap closure to mate with a smooth sealing surface on the top of the neck fitment. Preferably an annular integral sealing bead is provided on the neck fitment as illustrated in the preferred embodiment.

The customer who prepares the bottle for market use normally utilizes assembly line techniques to fill the bottle through the full neck opening. The fitment is usually then applied over the neck of the filled bottle by an automatic capping machine from a bulk supply of the fitments. To insure that the fitment reaches the capping machine in properly oriented position, i.e., with the bottom of the side wall below the top rather than vice versa, an additional channel member, unrelated to the function of the fitment, may be integrally molded to the underside of the top to offset the center of gravity of the piece, as shown in the illustrated embodiment.

With the technique of the present invention a blow molded thermoplastic bottle is provided with a restricted discharge opening wherein the step of reaming smooth the inside surface of the bottle in order to accept a tight fitting plug is omitted. Elimination of this step is especially significant when the thermoplastic utilized is unusually hard and tough, as for example, vinyl chloride polymers and copolymers, where tooling costs for machining are especially high. With the present invention, production costs are reduced by increasing the number of bottles processed per tooling. The restricted discharge opening is provided by neck extension means adapted to fit over and lock to the outside of the thermoplastic bottle neck, independent of the condition of the inside neck surface.

Since it is the principal object of this invention to overcome the problem of pop-out of bottle plugs when fairly large pressures are developed within a bottle by squeezing the body, it is necessary that the bottle be of a flexible material. Preferred materials are thermoplastics capable of being pressure or blow molded. Typical materials are low, intermediate or high density polyethylene, polypropylene or polystyrene. Polymers of vinyl chloride are preferred.

The cooperating locking means of the fitment and bottle set forth in the preferred embodiment provide for improved adherence of the fitment to the bottle to give a tight and effective seal between fitment and neck when pressure is developed by squeezing the flexible bottle body. When the pressure of the contents is exerted against a resilient fitment by pressing the bottle sides, the top has a tendency to bow upward, thereby forcing the integral side wall inward and tightly locking the inwardly extending lip under the annular locking bead of the neck. In addition, the locking means of the present invention overcomes the necessity for maintaining extremely tight circular tolerances on both the inside of the bottle neck and plug, which provisions are necessary to provide acceptable retention of the plug within the neck as employed in the prior art.

The neck fitment, therefore, must also be made of a flexible material in order to realize the advantage of the improved locking provisions of the present invention. Any resilient thermoplastic material may be used with low density polyethylene preferred.

As the orifice opening of the fitment in the preferred embodiment decreases, the seal between fitment and bottle becomes tighter, since more pressure must be developed within the bottle to force the contents through the orifice. Thus the locking provisions of the present invention are particularly applicable when small orifices of at least 0.005 inch diameter are utilized. The orifice size may be as large as desired, but, in general, should not be larger than ½ the inside diameter of the bottle neck.

The bottle and attachments provided by the present invention may be used in any fluid application wherein it is desirable to restrict the flow of contents from the bottle, e.g., cosmetics, powders, hair oils, etc. The preferred application is for dispensing liquid materials.

Although this invention has been described with a certain degree of particularity, it is understood that the present disclosure has been made only by way of example, and that numerous changes in the details of construction and in the combination and arrangement of parts may be resorted to without departing from the spirit and scope of the invention hereinafter claimed.

What is claimed is:

1. In combination, a thermoplastic bottle having an open generally cylindrical neck having an inner face, an outer face and a sealing surface at its upper extremity, locking means on the outer face of said neck adjacent said upper extremity, a fitment for said neck having a generally cylindrical side wall, a top integrally attached to the upper periphery of the side wall, said top having an inner peripheral sealing surface, a depressed central portion which extends downward with respect to the upper periphery of the side wall to create a radially uninterrupted drainage reservoir within the border of the depressed portion, an unrestricted opening located within the reservoir and extending between the outer and inner surfaces of the depressed portion whereby liquid within the reservoir may drain through the opening into the bottle, said side wall having cooperating locking means such that when said fitment is applied on said neck, the cooperating locking means of said fitment engage the locking means of said neck and said inner peripheral surface of the top of said fitment sealably contacts the sealing surface at the upper extremity of said neck, with the inner face of said neck remaining out of contact with said fitment.

2. The combination as set forth in claim 1 wherein the locking means of said neck comprises an integral outwardly extending annular projection and the cooperating locking means of said fitment comprises an integral inwardly protruding lip, said lip designed to matingly contact the lower surface of said projection when said fitment is on said neck.

3. The combination as set forth in claim 1 wherein the opening of said fitment is an orifice having a diameter of at least 0.005 inch.

4. The combination as set forth in claim 1 wherein the bottle is composed of polymeric polyvinyl chloride plastic material and the fitment is composed of low density polyethylene.

5. In combination, a thermoplastic bottle having an open, generally cylindrical neck, said neck having a lower portion having an outer face and an inner face, and an integral upper portion having an inside surface, an outside surface with locking means formed thereon and a smooth sealing surface at its upper extremity, said upper portion being radially indented inward from the outer face of said lower portion to form a circular shoulder located between the outside surface of said upper portion and an extension of the outside surface of said lower portion, neck extension means comprising a generally cylindrical side wall generally equivalent in length to said upper portion of said neck, said side wall having an inside surface with cooperating locking means thereon, a top integrally attached to the upper periphery of said side wall having an inner peripheral sealing surface, a central portion tapering downwardly and inwardly to an annular edge defining an unrestricted discharge opening extending between the upper and lower surfaces of the depressed portion, said discharge opening being centrally located within the periphery of the depressed portion, the area on the lower surface of the depressed portion which surrounds the opening being of a substantially greater diameter than that of the opening, said top and side wall of said neck extension means being designed so that the inner peripheral sealing surface of said top sealably contacts the sealing surface of said neck and the cooperating locking means of the side wall engage the locking means of said neck when said neck extension means is applied over said neck, with the inner face of said neck remaining out of contact with said neck extension means.

6. In combination, a thermoplastic bottle having an open, generally cylindrical neck, said neck having a lower portion having an outer face with primary thread means formed thereon, an inner face, and an integral upper portion having an inside surface, an outside surface with locking means formed thereon and a sealing surface at its upper extremity, said upper portion being radially indented inwardly from the outer face of said lower portion to form a circular shoulder located between the outside surface of said upper portion and an extension of the outside surface of said lower portion, said indentation defining an annular slot adjacent the outer face of said upper portion of said neck above said shoulder, neck extension means comprising a generally cylindrical side wall generally equivalent in length to said upper portion of said neck, said side wall having an inside surface with cooperating locking means formed thereon, a top within said side wall, said top having a substantially horizontal first portion integrally attached to the upper periphery of the side wall, an intermediate portion tapering downwardly and inwardly from the inner end of the first portion, and a second portion extending substantially horizontally inwardly from the base of the intermediate portion to an annular edge defining an unrestricted discharge opening extending between the upper and lower surfaces of the second portion, said discharge opening being centrally located with respect to the base of the intermediate portion, said top and side wall of said neck extension means being designed so that the inner surface of said first portion of the top sealably contacts the sealing surface of said neck, said side wall matingly fits into said annular slot, and said cooperating locking means engage the locking means of said neck when said neck extension means is applied over said neck, with the inner faces of said upper and lower portions of said neck remaining out of contact with said neck extension means, and a cap having a closed top having sealing means and secondary thread means thereon designed to engage said primary thread means of the neck, with said sealing means of the closed top designed to sealably engage said neck extension means when said cap is axially screwed onto said neck and over said neck extension means.

References Cited

UNITED STATES PATENTS

| | | |
|---|---|---|
| 2,630,944 | 3/1953 | Wheaton. |
| 3,113,831 | 12/1963 | Coale. |
| 3,122,256 | 2/1964 | Orr _____ 215—43 |
| 3,233,770 | 2/1966 | Waters _____ 215—40 |

DONALD F. NORTON, *Primary Examiner.*